(12) United States Patent
Chen et al.

(10) Patent No.: US 8,433,251 B2
(45) Date of Patent: Apr. 30, 2013

(54) CONTROL INFORMATION SIGNALING

(75) Inventors: Wanshi Chen, San Diego, CA (US);
Aamod Dinkar Khandekar, San Diego, CA (US); Jelena M. Damnjanovic, San Diego, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 12/891,672

(22) Filed: Sep. 27, 2010

(65) Prior Publication Data

US 2011/0076962 A1 Mar. 31, 2011

Related U.S. Application Data

(60) Provisional application No. 61/246,496, filed on Sep. 28, 2009.

(51) Int. Cl.
*H04B 1/00* (2006.01)
*H04B 7/00* (2006.01)

(52) U.S. Cl.
USPC ............... 455/68; 455/91; 455/352; 370/255; 370/277; 375/260; 375/295

(58) Field of Classification Search .............. 455/68, 455/91, 352, 434; 370/255, 277, 328, 329, 370/330; 375/260, 295, 316
See application file for complete search history.

(56) References Cited

FOREIGN PATENT DOCUMENTS
WO WO2010127300 A2 11/2010

OTHER PUBLICATIONS

Panasonic, "Component carrier indication scheme for carrier aggregation", 3GPP Draft, R1-093465, 3rd Generation Partnership Project (3GPP), No. Shenzhen, China, Aug. 18, 2009, XP050351735, France [retrieved on Aug. 18, 2009].*
Research in Motion UK Limited, "Carrier Indication for Carrier Aggregation", 3GPP Draft, R1-093296 (RIM-Carrier Indication for CA), 3rd Generation Partnership Project (3GPP), No. Shenzhen, China, Aug. 18, 2009, XP050351620, France [retrieved on Aug. 18, 2009].*
International Search Report and Written Opinion—PCT/US2010/050574—ISA/EPO—Mar. 14, 2011.
Panasonic, "Component carrier indication scheme for carrier aggregation", 3GPP Draft, R1-093465, 3rd Generation Partnership Project (3GPP), No. Shenzhen, China, Aug. 18, 2009, XP050351735, Franc.

(Continued)

*Primary Examiner* — Tuan H Nguyen
(74) *Attorney, Agent, or Firm* — Steven A. Raney

(57) ABSTRACT

Methods, systems, apparatus and computer program products are provided to facilitate the configuration and allocation of control information associated with transmissions of a wireless communication system. In systems that utilize multiple component carriers, cross-carrier signaling may be used to carry the control information associated with one component carrier on a different component carrier. By allowing control information messages to share their allocated search spaces, the number of decoding attempts needed to obtain control information can be kept within desirable limits while improving scheduling and resource allocation flexibility. This Abstract is provided for the sole purpose of complying with the Abstract requirement rules that allow a reader to quickly ascertain the disclosed subject matter. Therefore, it is to be understood that it should not be used to interpret or limit the scope or the meaning of the claims.

67 Claims, 13 Drawing Sheets

OTHER PUBLICATIONS

PDCCH blind decoding—Outcome of offline discussions, R1-081101, Internet Citation, Feb. 11, 2008, pp. 1-7, XP002534832, Retrieved from the Internet,: URL: http,//ftp.3gpp.org/tsg_ran/WGI_RLI/TS GRI_52/Docs/?C=N.

Research in Motion UK Limited, "Carrier Indication for Carrier Aggregation", 3GPP Draft, R1-093296 (RIM-Carrier Indication for CA), 3rd Generation Partnership Project (3GPP), No. Shenzhen, China, Aug. 18, 2009, XP050351620.

Sharp, "PDCCH structure for carrier aggregation in LTE-Advanced", 3GPP Draft, R1-093184, 3rd Generation Partnership Project (3GPP), No. Shenzhen, China, Aug. 18, 2009, XP050351540.

* cited by examiner

Scenario B:
CC1 Schedules CC1 and CC2

CONTROL INFORMATION SIGNALING

The present application claims priority to U.S. Provisional Patent Application Ser. No. 61/246,496, entitled "TRANSMISSION MODE AND CONTROL CHANNEL SIGNALING," filed Sep. 28, 2009, the entirety of which is hereby incorporated by reference.

FIELD OF INVENTION

The present invention relates generally to the field of wireless communications and, more particularly, to providing control information in a wireless communication system.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on the forward and reverse links. The forward link (or downlink) refers to the communication link from the base stations to the user equipment, and the reverse link (or uplink) refers to the communication link from the user equipment to the base stations. This communication link can be established through a single-in-single-out, multiple-in-single-out or a multiple-in-multiple-out (MIMO) system.

SUMMARY

The disclosed embodiments relate to systems, methods, apparatus and computer program products that facilitate the allocation and extraction of control information in a communication system.

One aspect of the disclosed embodiments relates to a method that comprises configuring a plurality of component carriers in a wireless communication system and allocating a first search space for control information messages associated with a first component carrier and a second search space for control information messages associated with a second component carrier. The method also comprises obtaining at least a first control information message associated with the first component carrier and transmitting the first control information message using at least the second search space.

In an embodiment, the above noted method further comprises transmitting the first control information message using the first search space. In one embodiment, the first and the second search spaces accommodate control information messages with the same size, while in another embodiment, the first and the second component carriers are associated with the same transmission mode. According to another embodiment, the first search space and the second search space are located on one component carrier. In still another embodiment, the first search space and the second search space are located on the first component carrier.

According to another embodiment, the first search space and the second search space are located on different component carriers. For example, the first search space is located on the first component carrier and the second search space is located on the second component carrier. In another embodiment, the first control information message comprises a carrier indicator field (CIF). In one variation, the CIF is three bits.

In another embodiment, the first search space and the second search space each comprise a common search space and a user-specific search space. In such a case, the transmission of the first control information message is carried out using the user-specific search space associated with the second search space. In another embodiment, each of the first search space and the second search space consists of a user-specific search space only. In still another embodiment, the first search space and the second search space each comprise a plurality of control channel elements (CCEs). In one example, each CCE comprises 36 resource elements. In another example, the plurality of CCEs accommodate aggregation levels 1, 2, 4 and 8.

According to another embodiment, the first control information message is a downlink control information (DCI) message in a long term evolution (LTE) system. In still another embodiment, the first search space and the second search space comprise overlapping control channel elements in a downlink control channel, while in another embodiment, the first search space and the second search space comprise non-overlapping control channel elements in a downlink control channel.

Another aspect of the disclosed embodiments relates to a method that comprises receiving information in a wireless communication system that operates using a plurality of component carriers, where the received information comprises one or more control information messages associated with one or more component carriers. This method also comprises searching a first and a second search space to detect a first control information message, where the first search space is allocated to accommodate control information messages associated with a first component carrier and the second search space is allocated to accommodate control information messages associated with a second component carrier. According to this method, the first control information message is associated with the first component carrier. In one embodiment, searching the first and the second search spaces in the above noted method comprises conducting a blind detection to detect an association between the first control information message and a user equipment.

Another aspect of the disclosed embodiments relates to an apparatus that comprises means for configuring a plurality of component carriers in a wireless communication system and means for allocating a first search space for control information messages associated with a first component carrier and a second search space for control information messages associated with a second component carrier. The apparatus also comprises means for obtaining at least a first control information message associated with the first component carrier, and means for transmitting the first control information message using at least the second search space.

Another aspect of the disclosed embodiments relates to an apparatus that comprises means for receiving information in a wireless communication system that operates using a plurality of component carriers, where the received information comprising one or more control information messages associated with one or more component carriers. The apparatus also comprises means for searching a first and a second search space to detect a first control information message, where the first search space is allocated to accommodate control information messages associated with a first component carrier and the second search space is allocated to accommodate control information messages associated with a second component carrier. Further, the first control information message is associated with the first component carrier.

Another aspect of the disclosed embodiments relate to an apparatus that comprises a processor and a memory that includes processor executable code. The processor executable code, when executed by the processor, configures the apparatus to configure a plurality of component carriers in a wireless communication system and allocate a first search space for control information messages associated with a first component carrier and a second search space for control information messages associated with a second component carrier. The processor executable code, when executed by the processor, also configures the apparatus to obtain at least a first control information message associated with the first component carrier, and transmit the first control information message using at least the second search space.

Another aspect of the disclosed embodiments relates to an apparatus that comprises a processor and a memory comprising processor executable code. The processor executable code, when executed by the processor, configures the apparatus to receive information in a wireless communication system that operates using a plurality of component carriers, where the received information comprising one or more control information messages associated with one or more component carriers. The processor executable code, when executed by the processor, also configures the apparatus to search a first and a second search space to detect a first control information message, where the first search space is allocated to accommodate control information messages associated with a first component carrier and the second search space is allocated to accommodate control information messages associated with a second component carrier. Further, the first control information message is associated with the first component carrier.

Another aspect of the disclosed embodiments relates to a computer program product, embodied on a non-transitory computer readable medium. The computer program product comprises computer code for configuring a plurality of component carriers in a wireless communication system and computer code for allocating a first search space for control information messages associated with a first component carrier and a second search space for control information messages associated with a second component carrier. The computer program product also comprises computer code for obtaining at least a first control information message associated with the first component carrier, and computer code for transmitting the first control information message using at least the second search space.

Another aspect of the disclosed embodiments relates to a computer program product, embodied on a non-transitory computer readable medium. The program product comprises computer code for receiving information in a wireless communication system that operates using a plurality of component carriers, where the received information comprising one or more control information messages associated with one or more component carriers. The program product also comprises computer code for searching a first and a second search space to detect a first control information message, where the first search space is allocated to accommodate control information messages associated with a first component carrier and the second search space is allocated to accommodate control information messages associated with a second component carrier. Further, the first control information message is associated with the first component carrier.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
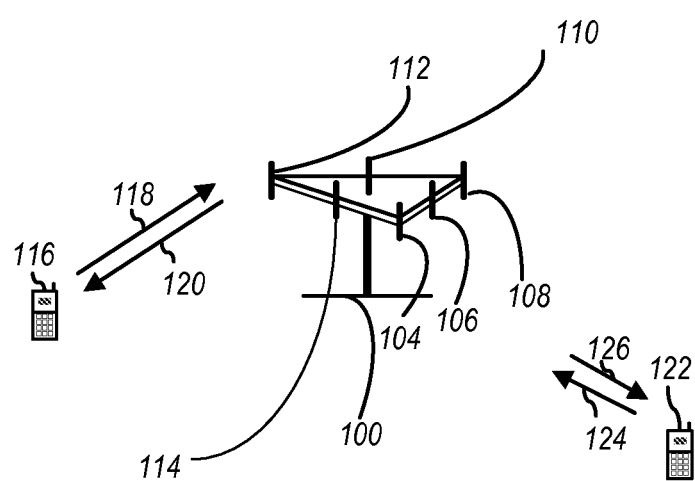
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \geq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to achieve transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

| | |
|---|---|
| 3G | 3rd Generation |
| 3GPP | 3rd Generation Partnership Project |
| ACLR | Adjacent channel leakage ratio |
| ACPR | Adjacent channel power ratio |
| ACS | Adjacent channel selectivity |
| ADS | Advanced Design System |
| AMC | Adaptive modulation and coding |
| A-MPR | Additional maximum power reduction |
| ARQ | Automatic repeat request |
| BCCH | Broadcast control channel |
| BTS | Base transceiver station |
| CDD | Cyclic delay diversity |
| CCDF | Complementary cumulative distribution function |
| CDMA | Code division multiple access |
| CFI | Control format indicator |
| Co-MIMO | Cooperative MIMO |
| CP | Cyclic prefix |
| CPICH | Common pilot channel |
| CPRI | Common public radio interface |
| CQI | Channel quality indicator |
| CRC | Cyclic redundancy check |
| DCI | Downlink control indicator |
| DFT | Discrete Fourier transform |
| DFT-SOFDM | Discrete Fourier transform spread OFDM |
| DL | Downlink (base station to subscriber transmission) |
| DL-SCH | Downlink shared channel |
| DSP | Digital signal processing |
| DT | Development toolset |
| DVSA | Digital vector signal analysis |
| EDA | Electronic design automation |
| E-DCH | Enhanced dedicated channel |
| E-UTRAN | Evolved UMTS terrestrial radio access network |
| eMBMS | Evolved multimedia broadcast multicast service |
| eNB | Evolved Node B |
| EPC | Evolved packet core |
| EPRE | Energy per resource element |
| ETSI | European Telecommunications Standards Institute |
| E-UTRA | Evolved UTRA |
| E-UTRAN | Evolved UTRAN |
| EVM | Error vector magnitude |
| FDD | Frequency division duplex |
| FFT | Fast Fourier transform |
| FRC | Fixed reference channel |
| FS1 | Frame structure type 1 |
| FS2 | Frame structure type 2 |
| GSM | Global system for mobile communication |
| HARQ | Hybrid automatic repeat request |
| HDL | Hardware description language |
| HI | HARQ indicator |
| HSDPA | High speed downlink packet access |
| HSPA | High speed packet access |
| HSUPA | High speed uplink packet access |
| IFFT | Inverse FFT |
| IOT | Interoperability test |
| IP | Internet protocol |
| LO | Local oscillator |
| LTE | Long term evolution |
| MAC | Medium access control |
| MBMS | Multimedia broadcast multicast service |
| MBSFN | Multicast/broadcast over single-frequency network |
| MCH | Multicast channel |
| MIMO | Multiple input multiple output |
| MISO | Multiple input single output |
| MME | Mobility management entity |
| MOP | Maximum output power |
| MPR | Maximum power reduction |
| MU-MIMO | Multiple user MIMO |
| NAS | Non-access stratum |
| OBSAI | Open base station architecture interface |
| OFDM | Orthogonal frequency division multiplexing |
| OFDMA | Orthogonal frequency division multiple access |
| PAPR | Peak-to-average power ratio |

-continued

| | |
|---|---|
| PAR | Peak-to-average ratio |
| PBCH | Physical broadcast channel |
| P-CCPCH | Primary common control physical channel |
| PCFICH | Physical control format indicator channel |
| PCH | Paging channel |
| PDCCH | Physical downlink control channel |
| PDCP | Packet data convergence protocol |
| PDSCH | Physical downlink shared channel |
| PHICH | Physical hybrid ARQ indicator channel |
| PHY | Physical layer |
| PRACH | Physical random access channel |
| PMCH | Physical multicast channel |
| PMI | Pre-coding matrix indicator |
| P-SCH | Primary synchronization signal |
| PUCCH | Physical uplink control channel |
| PUSCH | Physical uplink shared channel. |

Figure 2:
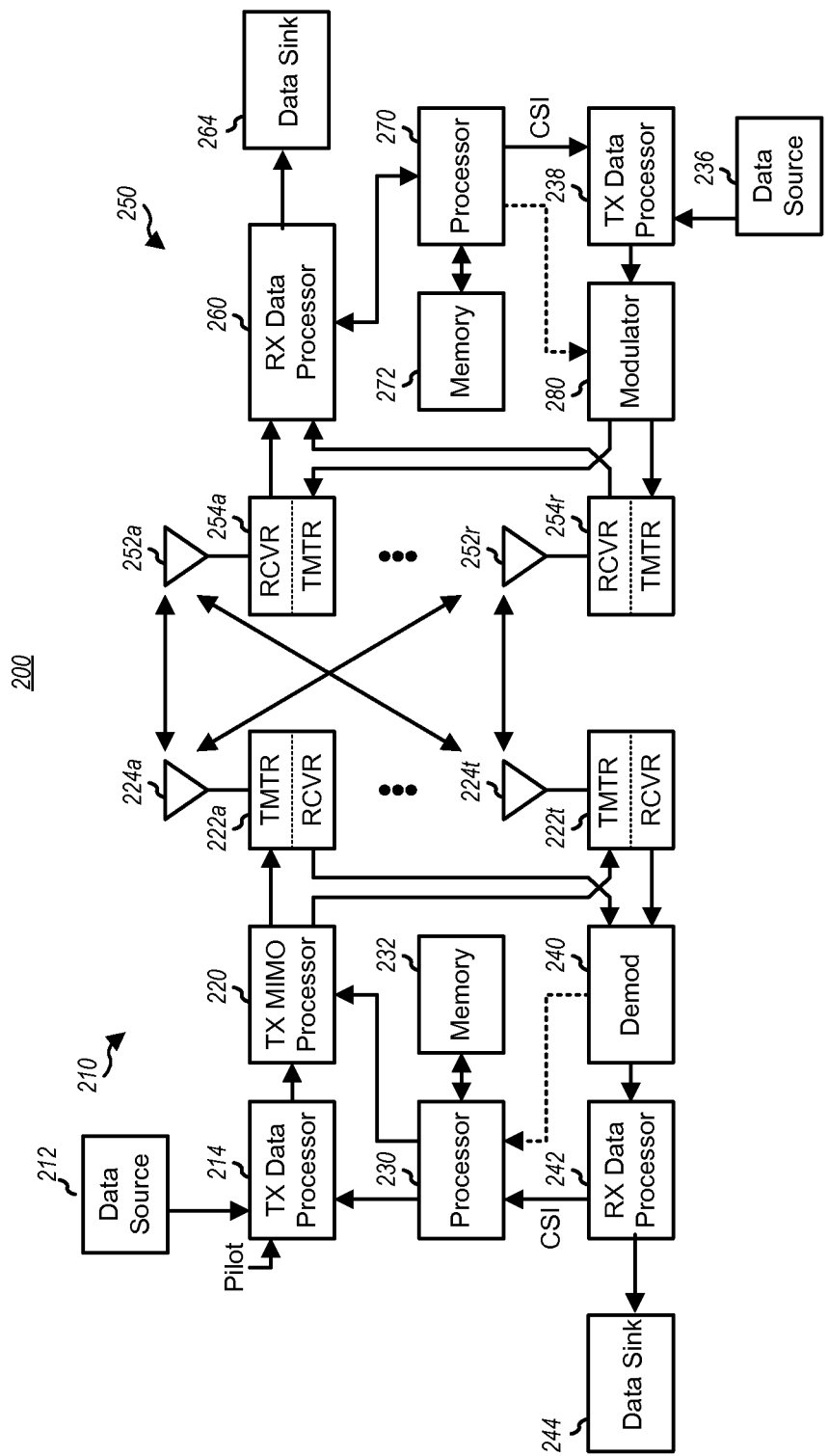
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In LTE systems, the physical downlink shared channel (PDSCH) carries data and signaling information to a user equipment, while the physical downlink control channel (PDCCH) carries a message known as downlink control information (DCI). The DCI can include information such as scheduling assignments associated with the downlink signaling, HARQ information, spatial multiplexing information, power control information, uplink scheduling grants and the like. The user equipment attempts to decode the DCI by performing a process known as a blind decode, during which a plurality of decode attempts are carried out until the proper DCI is detected. In a system that utilizes multiple component carriers, the number of decode attempts performed by the user equipment may increase.

The size of the DCI messages can differ depending on the type and amount of information that is carried by the DCI. For example, if spatial multiplexing in supported, the size of the DCI message is larger compared to scenarios where contiguous frequency allocations are made. Similarly, for a system that employs MIMO, the DCI must include additional signaling information that are not needed for systems that do not utilize MIMO. Accordingly, the DCI has been categorized in different formats that are suited for different configurations. Table 1 summarizes the DCI formats that are listed as part of LTE Rel-8 specifications. It should be noted that the disclosed embodiments can also be implemented in conjunction with other DCI formats and/or sizes.

TABLE 1

Exemplary DCI Formats

| DCI Format | Purpose | Number of Bits (10 MHz) |
|---|---|---|
| 0 | Uplink Resource Grant | 42 |
| 1 | Downlink Resource Assignment-single codeword | 47 |
| 1A | Downlink Resource Assignment-single codeword/compact format | 42 |
| 1B | Downlink Resource Assignment-rank-1 transmission | 46 |
| 1C | Downlink Resource Assignment-very compact format | 26 |
| 1D | Downlink Resource Assignment-multi-user MIMO | 46 |
| 2 | Downlink Resource Assignment-closed-loop MIMO | 62 |
| 2A | Downlink Resource Assignment-open-loop MIMO | 58 |
| 3 | Transmit Power Control Commands-PUCCH and PUSCH with 2-bit power adjustment | 42 |
| 3A | Transmit Power Control Commands-PUCCH and PUSCH with 1-bit power adjustment | 42 |

The size of a DCI format depends not only on the amount of information that is carried within the DCI message, but also on other factors such as the transmission bandwidth, the number of antenna ports, TDD or FDD systems, etc. For example, the exemplary sizes that are listed in Table 1 for different DCI formats are associated with a system bandwidth of 50 resource blocks, an FDD system, and four antennas at the eNodeB, corresponding to a 10 MHz bandwidth.

In order to simplify the decoding of the DCI messages at the user equipment, the LTE Rel-8 specifications also require that DCI format 0 (used for uplink grants) and format 1A (used for downlink resource assignment) to be always the same size. However, due to different information fields in DCI format 0 and DCI format 1A, as well as bandwidth differences between the uplink and downlink channels, the size of a format 0 DCI and format 1A DCI message can differ. Therefore, in situations where DCI formats 0 and 1A have different sizes, the smaller of the two is padded with zeroes to produce same size DCI messages. In order to differentiate between format 0 and format 1A DCI messages, a single bit in both formats is provided that signals the presence of either format 0 or format 1A.

It should be noted that in some systems, the DCI messages are also appended with cyclic redundancy check (CRC) bits to facilitate error detection. The coded DCI bits are then mapped to what are called control channel elements (CCEs) according to the DCI format. A PDCCH can carry DCI messages associated with multiple user equipment. A particular user equipment must, therefore, be able to recognize the DCI messages that are intended for that particular user equipment. To this end, a user equipment is assigned certain identifiers (e.g., a cell radio network temporary identifier (C-RNTI)) that facilitate the detection of the DCI associated with that user equipment. To reduce signaling overhead, the CRC bits that are attached to each DCI payload are scrambled (e.g., masked) with the identifier (e.g., C-RNTI) associated with a particular user equipment and/or an identifier that is associated with a group of user equipment. In an operation that is called "blind detection," the user equipment can descramble (or de-mask) all potential DCI messages using the unique identifier, and perform a CRC check on the DCI payload. If the CRC check passes, the user equipment can declare to have discovered the intended DCI message.

To reduce power consumption and overhead at the user equipment, a limited set of control channel element (CCE) locations can be specified, wherein the set of CCE locations include locations at which a DCI payload associated with a particular UE can be placed. A CCE consists of a fixed number (e.g., 9) of resource element groups (REGs), where each REG consists of a fixed number (e.g., 4) of resource elements. The locations of the REGs for a CCE can be distributed over frequency and/or time. Each DCI may utilize a certain number of CCEs (e.g., 1, 2, 4, or 8), depending on the size of the DCI format, UE channel conditions, etc. The set of CCE locations in which the user equipment can find its corresponding DCI messages are considered a search space. The search space can be organized to include two types of search spaces: a common search space and a UE-specific search space. The common search space is monitored by all UEs served by a eNodeB and can include information such as paging information, system information, random access procedures, and the like. The UE-specific search space includes user-specific control information and is configured individually for each user equipment. Further, the CCEs for the common and user-specific search spaces may overlap.

Figure 3:
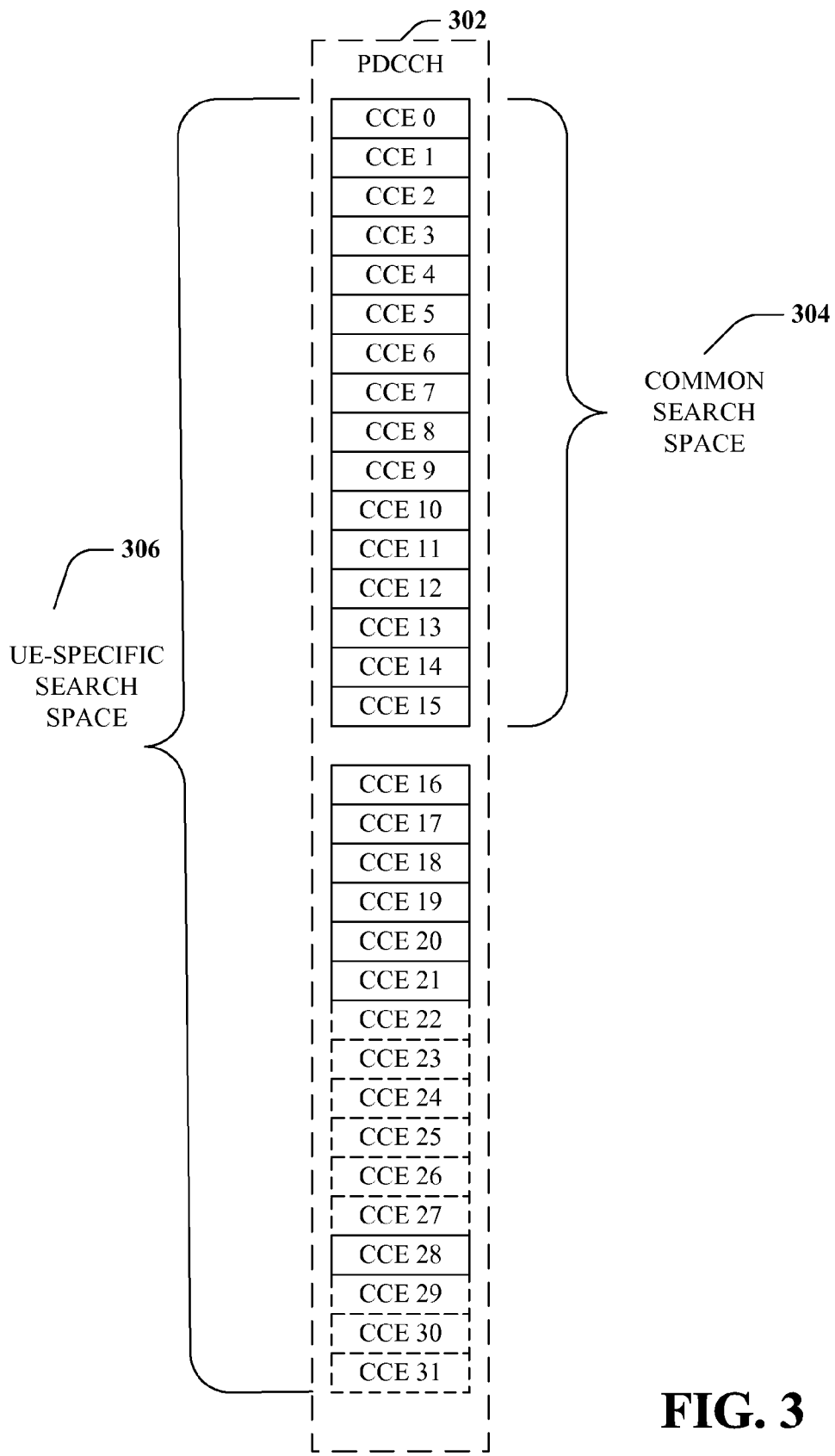
FIG. 3 illustrates exemplary search space.

FIG. 3 illustrates an exemplary search space 300 on a PDCCH 302 that is divided into a common search space 304 and a UE-specific search space 306. It should be noted that while, for simplicity, the exemplary search space 302 of FIG. 3 is illustrated as a collection of 32 back-to-back CCE blocks, it is understood that the disclosed embodiments can be implemented using a different number of CCEs. In LTE Rel-8 systems, each CCE contains a fixed number of resource elements in non-contiguous locations. However, the disclosed embodiments can be implemented in other systems that may use a different arrangement of CCEs and the associated resource blocks. Moreover, the common search space 304 and the UE-specific search space 306 may span overlapping CCEs. In LTE Rel-8 systems, the number of CCEs, denoted by $N_{CCE}$, available for PDCCH can be determined based on the system bandwidth, the size of the control region, the configuration of other control signals and other factors. In the example search space 302 that is depicted in FIG. 3, $N_{CCE}$=32. The set of CCEs for the common search space ranges from 0 to min$\{16, N_{CCE}-1\}$. For all the UEs, the set of CCEs for the UE-specific search space ranges from 0 to $N_{CCE}-1$, which is a superset of the CCEs that are available for the common search space. For a specific UE, the set of CCEs for the UE is a subset of the entire set within CCE 0 and CCE $N_{CCE}-1$, depending on the configured identifier and other factors.

The size of a search space, such as search space 302 of FIG. 3, or a set of CCE locations can be based upon an aggregation level. As noted earlier, the size of a DCI message can vary depending on the DCI format and the transmission bandwidth. The aggregation level specifies a number of contiguous CCEs utilized to convey a single DCI payload. In this context, "contiguous" CCEs can be logically or physically contiguous. For example, in LTE Rel-8 systems, the CCEs are logically contiguous. The common search space can include two aggregation levels: level-4 (e.g., 4 CCEs) and level-8 (e.g., 8 CCEs). In some systems, to reduce the computations that must be performed by a user equipment, aggregation level-4 of the common search space can be configured to accommodate a maximum of four DCI locations. Similarly, aggregation level-8 of the common search space can be configured to accommodate a maximum of 2 DCI locations.

Figure 4:
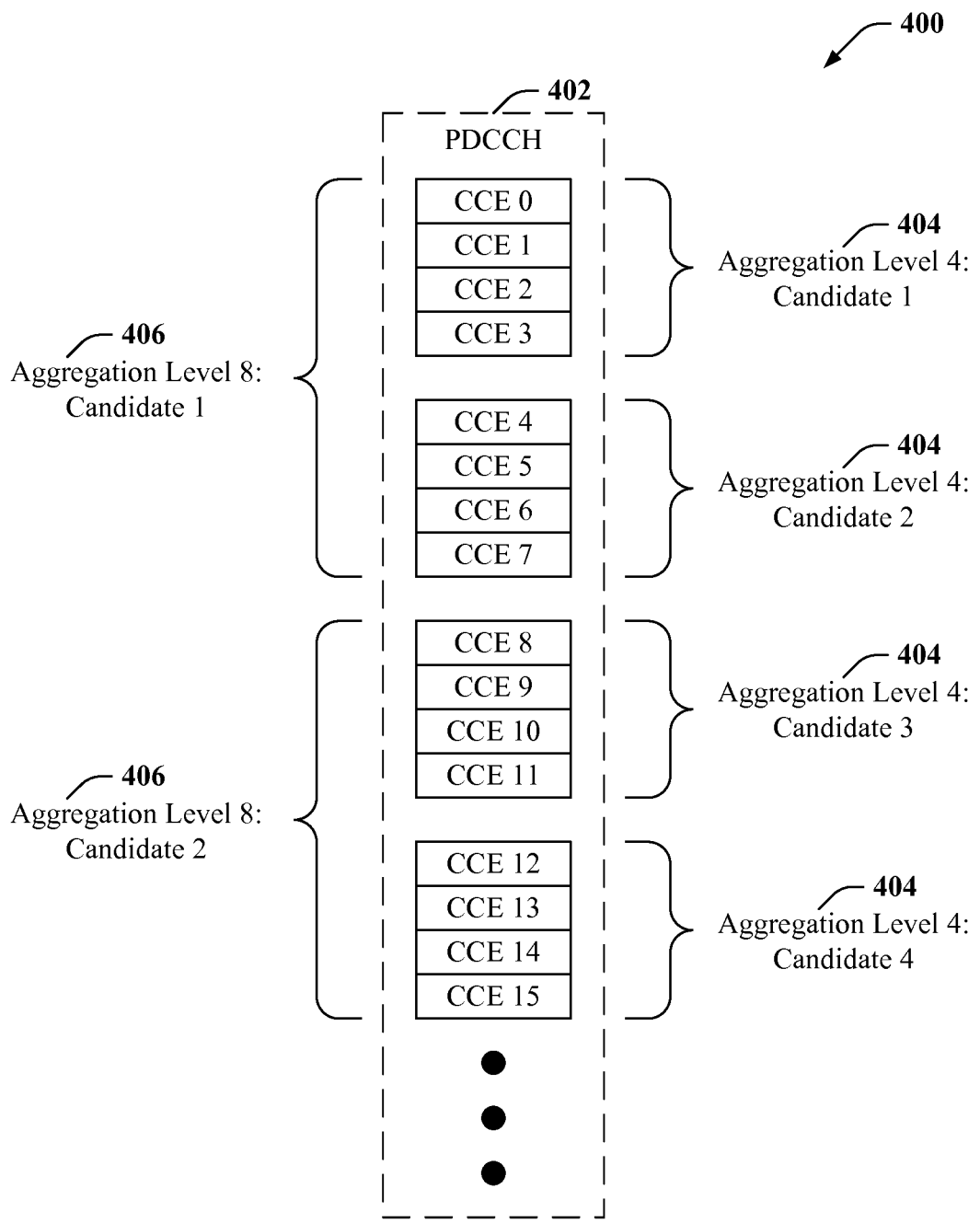
FIG. 4 illustrates a set of exemplary aggregation levels associated with a search space.

FIG. 4 provides a diagram showing an exemplary common search space 400 on a PDCCH 402 that is configured to accommodate four aggregation level-4 candidates 404 and two aggregation level-8 candidates 406. Accordingly, there are a total of 6 candidates in the exemplary common search space 400.

Figure 5:
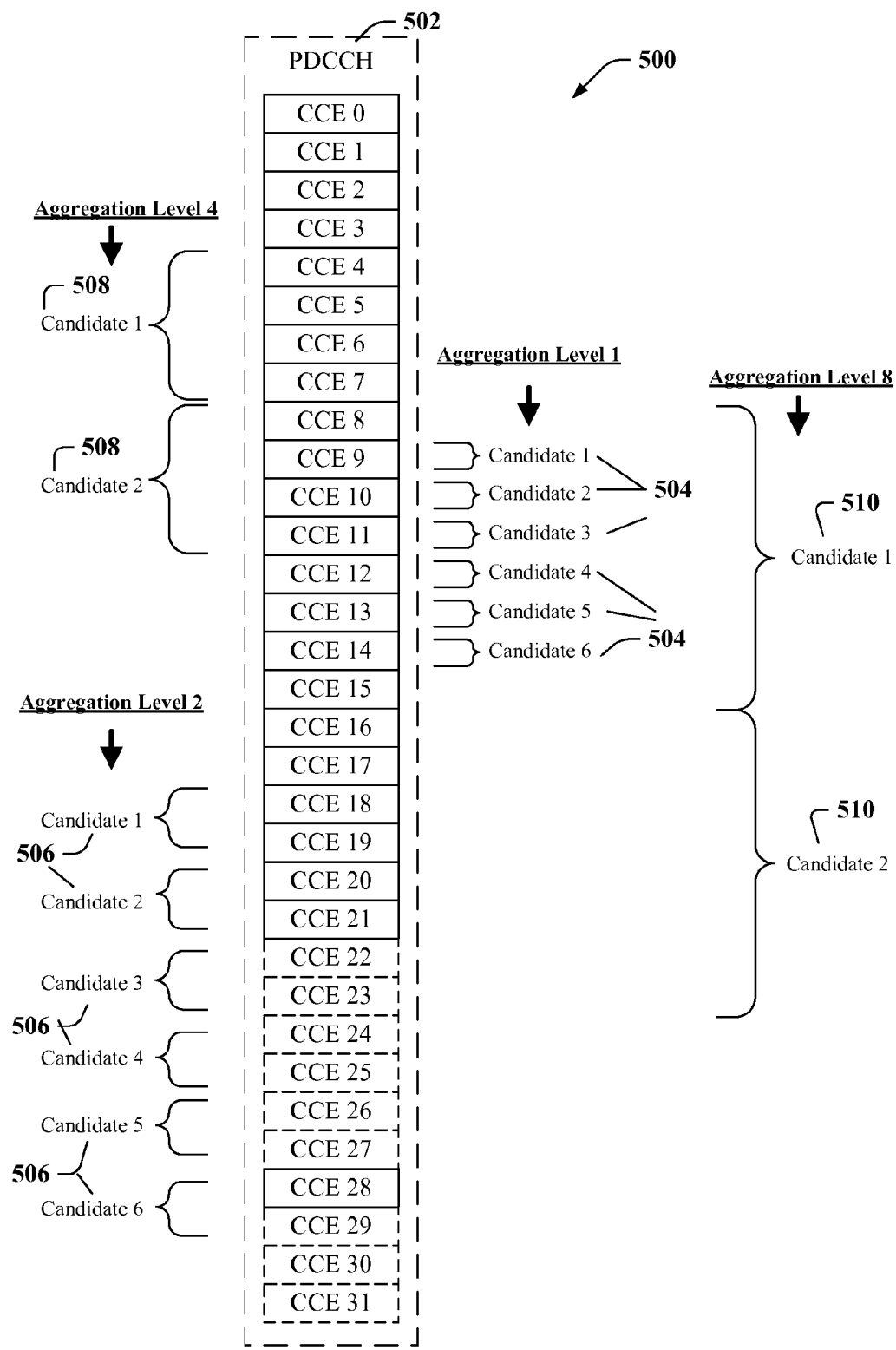
FIG. 5 illustrates another set of exemplary aggregation levels associated with a search space.

The UE-specific search space can be configured to include four aggregation levels: 1, 2, 4, or 8, corresponding to 1, 2, 4 and 8 CCEs, respectively. FIG. 5 provides an diagram of an exemplary UE-specific search space 500 on a PDCCH 502 that is configured to accommodate six aggregation level-1 candidates 504, six aggregation level-2 candidates 506, two aggregation level-4 candidates 508 and two aggregation level-8 candidates 510. Accordingly, there are a total of 16 candidates in the exemplary UE-specific search space 500.

In LTE Rel-8 systems, the starting CCE indices for different aggregation levels in the UE-specific search space 500 can be different, and follow the so-called "tree-structure." That is, for aggregation level L, the starting CCE index is always an integer multiple of L. Within each aggregation level, the UE-specific search space is logically contiguous. The starting CCE index for each aggregation level also depends on time (e.g., subframe number). Further, as discussed earlier, for a specific user equipment, the UE-specific search space 500 is a subset of the set $\{0, N_{CCE}-1\}$, where $N_{CCE}$ is the total number of available CCEs. In the example shown in FIG. 3, $N_{CCE}=32$.

As one example, due to the "tree-structure" and potentially different starting CCE indices for different aggregation levels, in a subframe, a UE may have CCE 9 as the starting CCE index for aggregation level-1, CCE 18 for aggregation level-2, CCE 4 for aggregation level-4, and CCE 8 for aggregation level-8. Since the UE-specific search space for each aggregation level is contiguous, the two candidates for aggregation level-4 for the UE are CCEs $\{4, 5, 6, 7\}$ and CCEs $\{8, 9, 10, 11\}$. It should be further noted that the exemplary common search space 400 of FIG. 4 and the exemplary UE-specific search space 500 of FIG. 5 are provided to facilitate the understanding of the underlying concepts associated with the disclosed embodiments. Therefore, it should be understood that common and UE-specific search spaces with different number and configurations of candidate locations may be configured and used in accordance with the disclosed embodiments.

Each candidate in the common search space and UE-specific search space represents a possible DCI transmission. If the DCI is for a specific user equipment, the CRC is masked with, for example, a C-RNTI. If the DCI contains paging information or system information, the CRC is masked with a paging RNTI (P-RNTI) or a system-information RNTI (S-RNTI). In other examples, additional RNTIs (or other codes) may be used for masking the CRC. As noted earlier, a user equipment conducts a blind detection to discover the location of the control information. For instance, in the example UE-specific search space 500 that is depicted in FIG. 5, a user equipment may conduct up to 16 detection attempts to determine which of the UE-specific candidate locations 504, 506, 508, 510 (if any) contain the DCI information associated with that user equipment. Additional decoding attempts may be needed due to additional RNTIs, DCI formats and multiple PDCCH candidates.

In some embodiments, the number of DCI blind decodes can be limited by configuring each user equipment (e.g., via higher layers using RRC signaling) to operate in one of several transmission modes in a semi-static manner. Table 2 provides an exemplary listing of some of the transmission modes. It should be noted that the disclosed embodiments can also be implemented in conjunction with other transmission modes that are not listed in Table 2.

TABLE 2

Exemplary Transmission Modes

| Transmission Mode Number | Description |
|---|---|
| 1 | Single Antenna Port-Port 0 |
| 2 | Transmit Diversity |
| 3 | Open-Loop Spatial Multiplexing |
| 4 | Closed-Loop Spatial Multiplexing |
| 5 | Multi User MIMO |
| 6 | Closed-Loop Rank 1 Precoding |
| 7 | Single Antenna Port-Beam Forming with UE-Specific Reference Signal |
| 8 | Single- or Dual-Layer Transmission with UE-Specific Reference Signal |

In one example, each transmission mode is associated with two downlink DCI formats of different sizes, one of which is always DCI format 1A. In this example, the DCI formats 0 and 1A can be forced to be of the same size (e.g., via zero-padding, if needed). Therefore, each transmission mode has a maximum of two associated DCI format sizes: one corresponding to formats 0/1A and the other corresponding to another DCI format. Using the common- and user-specific search spaces that are illustrated in FIGS. 3 through 5, the maximum number of blind decodes can be calculated as: (2 DCI sizes)×(6+16 search candidates)=44. It should be noted that, the maximum number of decode attempts can be generalized as: $N_T$=(total number of DCI sizes)×(number of search candidates).

Table 3 provides an exemplary listings of eight transmission modes and the associated DCI formats. It should be noted that the listing in Table 3 is only provided to facilitate the understanding of the underlying concepts. However, the disclosed embodiments are equally applicable to additional transmission modes and/or DCI format configurations associated with both the uplink and downlink transmissions.

TABLE 3

Exemplary Transmission Modes and Associated DCI Formats

| Transmission Mode Number | First DCI Format(s) | Second DCI Format |
|---|---|---|
| 1 | 0 and 1A | 1 |
| 2 | 0 and 1A | 1 |
| 3 | 0 and 1A | 2A |
| 4 | 0 and 1A | 2 |
| 5 | 0 and 1A | 1D |
| 6 | 0 and 1A | 1B |
| 7 | 0 and 1A | 1 |
| 8 | 0 and 1A | 2B |

In the exemplary listing of Table 3, DCI formats 0 and 1A (which both have the same size) are always selected as one of possible DCI formats for all transmission modes. However, each transmission mode is also associated with another DCI format that can vary based on the transmission mode number. For example, DCI format 2A can be associated with transmission mode 3, DCI format 1B can be associated with transmission mode 6, and DCI format 1 can be associated with transmission modes 1, 2 and 3.

The listing of Table 3 further illustrates that two or more of the transmission modes can have identical DCI formats. For example, in the exemplary listing of Table 3, transmission modes 1, 2 and 3 are each associated with DCI formats 0/1A and DCI format 1. Therefore, three different user equipment, or a user equipment with 3 component carriers, that are configured to operate in transmission modes 1, 2 and 3, respectively, may conduct a blind decode using the same DCI format sizes (assuming that all three user equipment utilize the same bandwidth). In some embodiments, a shared size of the DCI format associated with different component carriers of the user can be utilized to reduce the number of blind decodes and/or to increase the flexibility of search space configuration associated with different component carriers of the user. This aspect of the disclosed embodiments is discussed in the sections that follow.

The number of decodes associated with a blind detection scheme can further be increased in systems where multiple component carriers (CCs) are used. In some systems, multiple carrier aggregation may be used to increase the overall system bandwidth. For example, two 10 MHz component carriers and four 20 MHz component carriers can be aggregated to extend the bandwidth of an LTE system to 100 MHz. Such component carriers may span a contiguous portion of the spectrum or reside on non-contiguous portions of the spectrum.

Figure 6:
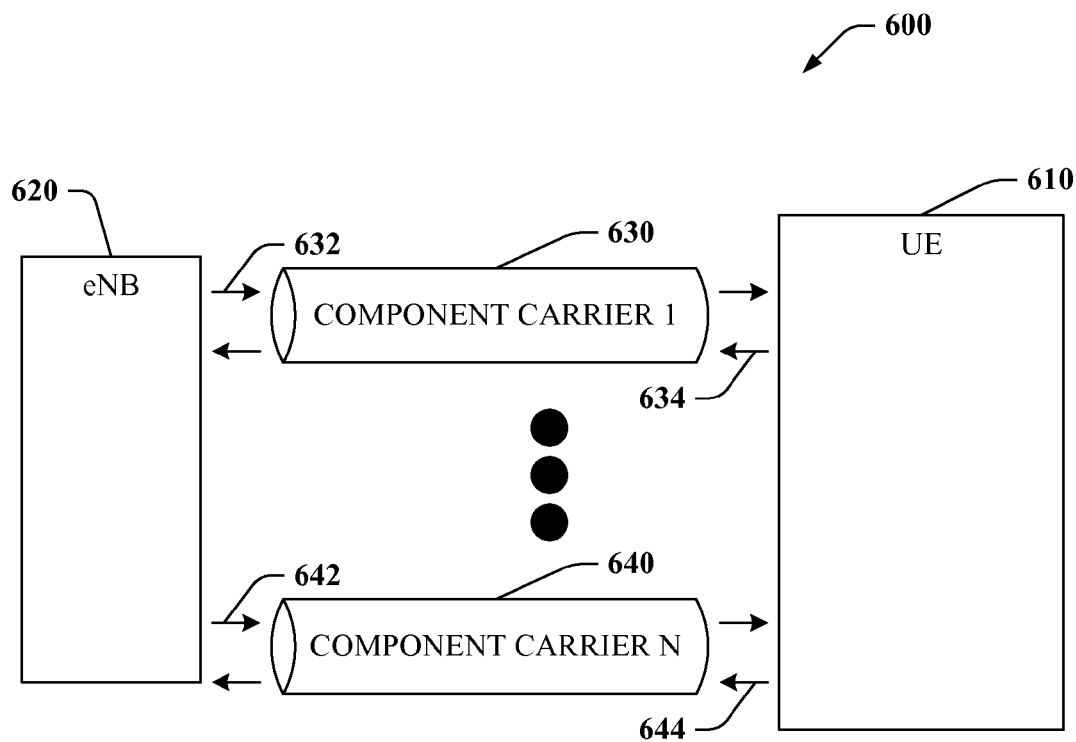
FIG. 6 illustrates a system within which various embodiments may be implemented.

FIG. 6 illustrates a system 600 that can be used in accordance with the disclosed embodiments. The system 600 can include a user equipment 610, which can communicate with an evolved Node B (eNB) 620 (e.g., a base station, access point, etc.). While only one user equipment 610 and one eNB 620 are illustrated in FIG. 6, it is to be appreciated that the system 600 can include any number of user equipment 610 and/or eNBs 620. The eNB 620 can transmit information to the user equipment 610 over a forward link 632, 642 or downlink channel. In addition, the user equipment 610 can transmit information to the eNB 620 over a reverse link 634, 644 or uplink channel. In describing the various entities of FIG. 6, as well as other figures associated with some of the disclosed embodiments, for the purposes of explanation, the nomenclature associated with a 3GPP LTE or LTE-A wireless network is used. However, it is to be appreciated that the system 600 can operate in other networks such as, but not limited to, an OFDMA wireless network, a CDMA network, a 3GPP2 CDMA2000 network, and the like.

In LTE-A based systems, the user equipment 610 can be configured with multiple component carriers utilized by the eNB 620 to enable a wider overall transmission bandwidth. As illustrated in FIG. 6, the user equipment 610 can be configured with "component carrier 1" 630 through "component carrier N" 640, where N is an integer greater than or equal to one. While FIG. 6 depicts two component carriers, it is to be appreciated that the user equipment 610 can be configured with any suitable number of component carriers and, accordingly, the subject matter disclosed herein and claims are not limited to two component carriers. In one example, some of the multiple component carriers can be LTE Rel-8 carriers. Thus, some of the component carrier can appear as an LTE carrier to a legacy (e.g., an LTE Rel-8 based) user equipment. Each component carrier 630 through 640 can include respective downlinks 632 and 642 as well as respective uplinks 634 and 644.

In multi-carrier operations, the DCI messages associated with different user equipment can be carried on a plurality of component carriers. For example, the DCI on a PDCCH can be included on the same component carrier that is configured to be used by a user equipment for PDSCH transmissions (i.e., same-carrier signaling). Alternatively, or additionally, the DCI may be signaled on a component carrier different from the target component carrier used for PDSCH transmissions (i.e., cross-carrier signaling). For example, with reference to FIG. 6, a downlink assignment on "component carrier 1" 630 can be indicated to the user equipment 610 via PDCCH on "component carrier N" 640. Cross-carrier signaling facilitates the operations of heterogeneous networks, where, for example, due to the TDM nature of the downlink control signaling structure, some of the component carriers can have unreliable control information transmissions. Therefore, in some examples, due to strong interference from neighboring cells, the transmission of control information may be advantageously carried on a different component carrier with less interference. In other examples, some of the component carriers may not be backward compatible or may not even carry control information. As a result, a different component carrier may be needed to provide the control signaling.

The use of multiple component carriers, however, can increase the number of blind detection attempts since a user equipment may need to monitor multiple component carriers in order to extract the appropriate DCI messages. For example, with reference to FIG. 6, let's assume that the user equipment 610 is configured to operate using "component carrier 1" 630 and "component carrier N" 640. A PDSCH and/or PUSCH transmission on "component carrier 1" 630 may be scheduled using a PDCCH transmitted on "component carrier 1" 630 (i.e., same carrier signaling), or on "component carrier N" 640 (i.e., cross-carrier signaling). In order to obtain the scheduling information, the user equipment 610 may attempt to decode PDCCH transmissions on both "component carrier 1" 630 and "component carrier N" 640. Such an increased number of decoding attempts may not be desirable since it also increases the probability of false detections associated with CRC calculations (or other error correction/detection operations that may be conducted to identify the DCI messages). Further, the increased computational burden on a user equipment can produce delays in receiving and transmitting information, as well as reducing the battery life of the user equipment.

In some embodiments, a carrier indicator field (CIF) may be included in some or all DCI formats to facilitate the transmission of PDCCH control signaling from a carrier other than the target carrier for PDSCH transmissions. In one example, the carrier indicator field comprises three bits that identify particular component carriers in a system that utilizes multiple component carriers. The inclusion of the carrier indicator field as part of the DCI allows a component carrier to be linked with another component carrier.

Figure 7:
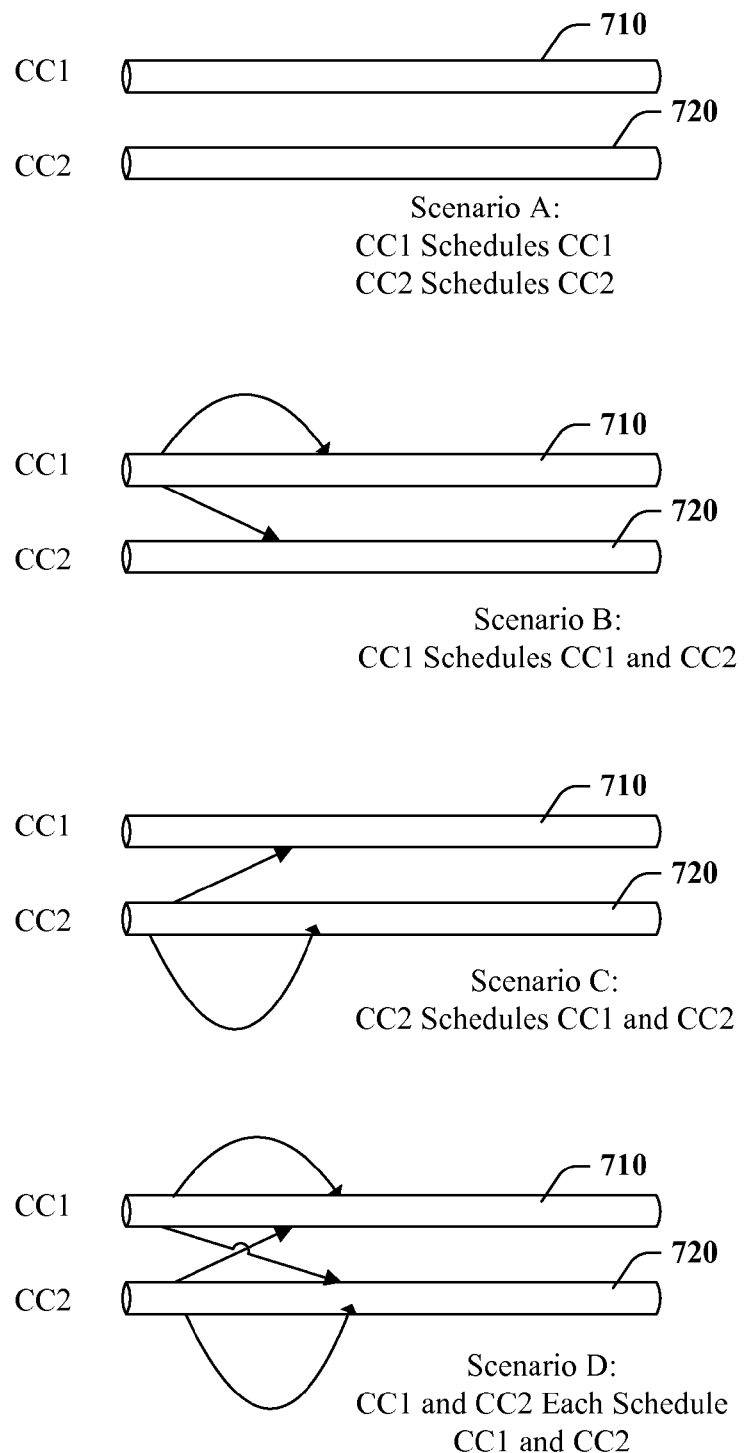
FIG. 7 illustrates a set of exemplary scheduling scenarios in a multiple component carrier system.

FIG. 7 illustrates four exemplary carrier signaling scenarios that can be carried out in accordance with the disclosed embodiments. In the exemplary Scenarios A through C, the control information (e.g., DCI on a PDCCH) for uplink or downlink transmissions can be carried on a single downlink component carrier or on a single linked carrier. In the exemplary Scenario D, however, the control information can be carried on multiple component carriers. More specifically, in Scenario A, the scheduling and other control information associated with uplink/downlink transmissions of component carrier 1 (CC1) 710 is carried on CC1 710, and the scheduling and other control information associated with uplink/downlink transmissions of CC2 720 is carried on CC2. In Scenario B, the scheduling and other control information associated with uplink/downlink transmissions of both CC1 710 and CC2 720 are carried on CC1 710. In Scenario C, the scheduling and other control information associated with uplink/downlink transmissions of both CC1 710 and CC2 720 are carried on CC2 720. Finally, in Scenario D, the scheduling and other control information associated with uplink/downlink transmissions of CC1 710 is carried on both CC1 710 and CC2 720, and the scheduling and other control information associated with uplink/downlink transmissions of CC2 720 is carried on both CC1 710 and CC2 720. While FIG. 7 illustrates only two component carriers, namely CC1 710 and CC2 720, to facilitate the description of the underlying concepts, it is understood that systems with additional component carriers can be used in conjunction with the disclosed embodiments.

As noted earlier, the user equipment conducts a blind detection over the common- and UE-specific search spaces to detect the appropriate DCI messages. According to the disclosed embodiments, in a multiple component carrier system, two or more search spaces on a single component carrier can be shared to signal control information of the same size. The same size DCI messages can further be associated with different component carriers.

Figure 8:
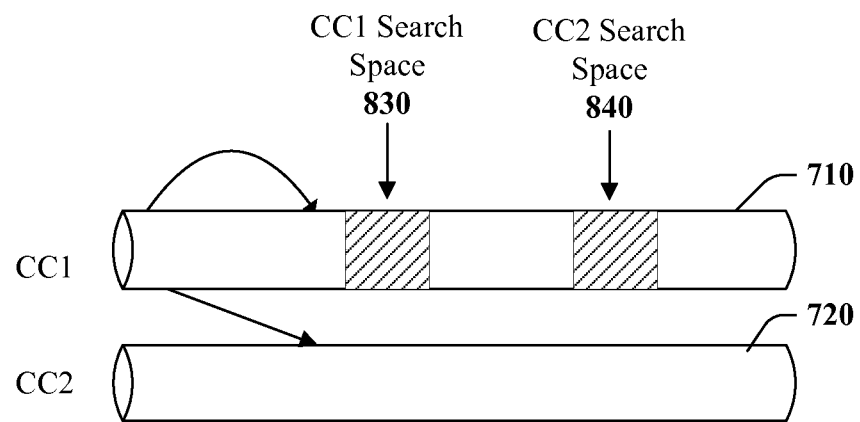
FIG. 8 illustrates a search space configuration in accordance with an exemplary embodiment.

FIG. 8 provides an illustration that facilitates the understanding of utilizing shared search spaces in accordance with the disclosed embodiments. The diagram in FIG. 8 corresponds to the exemplary Scenario B in FIG. 7, where the scheduling and other control information associated with uplink/downlink transmissions of both CC1 710 and CC2 720 are carried on CC1 710. In this exemplary scenario, a CC1 search space 830 may be configured separately from a CC2 search space 840 on a PDCCH of CC1 710. In a typical configuration, blind detection over the CC1 search space 820 may be conducted independently from the blind detection over the CC2 search space 830. However, according to the disclosed embodiments, when the size of the DCI formats associated with CC1 710 and CC2 720 are identical, both the CC1 search space 830 and the CC2 search space 840 can be used to carry the control information.

In the above example embodiment, since the DCI formats have the same size, the maximum number of blind decodes is unchanged compared to the configuration where the CC1 search space 830 and the CC2 search space 840 are independently considered. The following example further clarifies why the number of maximum blind detections does not increase. As noted in connection with an earlier example, the maximum number of blind decode attempts for a search space with 22 candidate locations can be calculated as: $N_T$=(Number of DCI sizes)×(22 search candidates). Since each transmission mode is configured with at least two DCI formats (e.g., see Table 3), when the CC1 search space 830 and the CC2 search space 840 are treated independently, the maximum number of decoding attempts is 44 for each search space, or 88 for both search spaces. However, when the CC1 search space 830 and the CC2 search space 840 are shared among DCI formats of the same size, still only two DCI sizes must be searched for each search space. As a result, the maximum number of decode attempts per search space is still 44, resulting a total of 88 for both search spaces. Therefore, the number of decode attempts remains unchanged at 88.

Due to an increased number of possible DCI formats, for a given DCI size, under each search space in the above-described shared search space configuration, the likelihood of a false positive CRC check value may also increase. On the other hand, sharing of the search spaces associated with two or more different DCI messages provides additional scheduling flexibility in allowing the use of a wider range of resources on the PDCCH.

Figure 9:
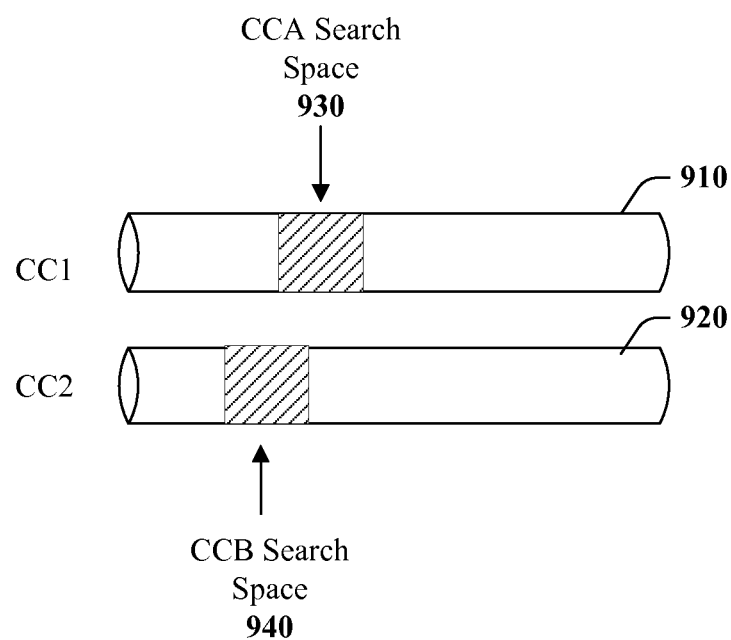
FIG. 9 illustrates a search space configuration in accordance with an exemplary embodiment.

The disclosed embodiments that allow the sharing of search spaces are also applicable to configurations where search spaces are allocated on different component carriers. FIG. 9 illustrates a first component carrier, CC1 910, that includes a CCA search space 930 comprising control information associated with component carrier A. FIG. 9 also illustrates a second component carrier, CC2 920, that includes a CCB search space comprising control information associated with component carrier B. According to the disclosed embodiments, the CCA search space 930 and the CCB search space 940 can be used together to accommodate signaling information associated with both component carrier A and component carrier B, in a case where both signaling information have the same DCI format size. In one example, component carrier A is CC1 910 and component carrier B is CC2 920. In another example, both component carriers A and B are the same component carrier (e.g., CC1 910). In the latter example, such a duplication of control information may be utilized to improve the likelihood of successful reception of the control information. In yet another example, one or both component carriers A and B are component carriers other than CC1 910 or CC2 920. In each of the above-described examples, the search spaces CCA 930 and CCB 940 can shared to effect signaling of the control information associated with one or more user equipment.

It should be noted that while the exemplary illustrations in FIGS. 7 through 9 only depict two component carriers, the disclosed embodiments are applicable to systems with more than two component carriers. Further, while only one or two search spaces are shown in the exemplary depictions of FIGS. 8 and 9, the disclosed embodiments are applicable, and can be extended to, more than two overlapping and/or non-overlapping search spaces.

In some embodiments, the control information signaling associated with component carriers of multiple component carrier systems is conducted based on a grouping of the transmission modes. More specifically, for a system with M component carriers and N transmission modes ($N \leq M$), the component carriers may be grouped into N groups in accordance with their configured transmission modes. For example, in a system with three transmission modes and five component carriers, three separate groups can be formed. In one example embodiment, cross-carrier signaling is enabled within each group of the component carriers. For example, a component carrier within group X is allowed to convey signaling information associated with its own uplink/downlink transmissions (i.e., same-carrier signaling) or uplink/downlink transmissions of other component carriers within group X (i.e., cross-carrier signaling), but not for component carriers that are not part of group X. The grouping of the component carriers based on a transmission mode ensures that all component carriers within a group use the same DCI formats and, therefore, have the same DCI format size when the same transmission bandwidth is used (see, for example, Table 3 for an exemplary listing transmission modes and the associated DCI formats).

The grouping of the component carriers in accordance with the associated transmission modes reduces the number of blind decode attempts since only a subset of component carriers (i.e., component carriers within a particular group) are searched. Such a search is further reduced in size since it is only conducted for the particular DCI formats that are associated with each transmission mode. Moreover, for a given bandwidth, all component carriers within each group have identical DCI format sizes. Therefore, the search spaces associated with multiple control information can be shared within each group of component carriers, which, as noted earlier, improves the scheduling flexibility without increasing the number of blind decodes.

Figure 10:
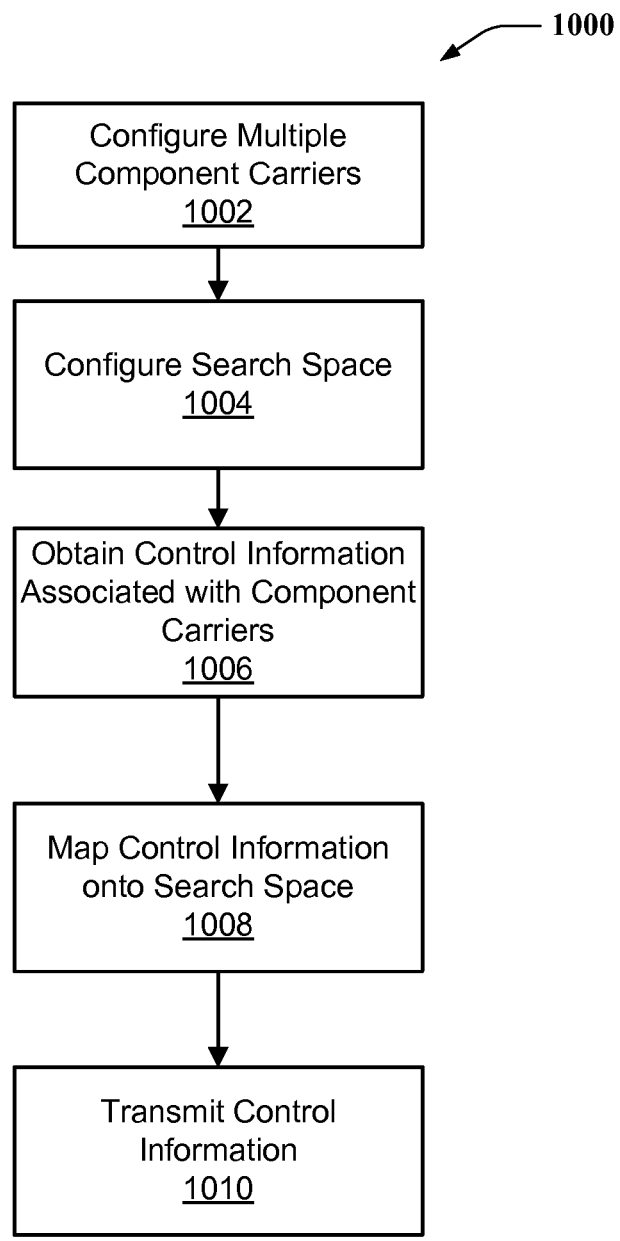
FIG. 10 is a flowchart illustrating the operation of one embodiment.

FIG. 10 illustrates the operations that are carried out in accordance with an exemplary embodiment. The process 1000 that is illustrated in FIG. 10 starts, at 1002, by configuring multiple component carriers. The configuration, at 1002, enables the system to operate in a multi-component carrier mode. Next, at 1004, the search spaces for the multiple component carriers are configured. The configuration of the search space, at 1004, can also enable sharing of the search space among one or more sets of control information messages. In an example embodiment, where cross-carrier signaling is used, the search space associated one set of control information messages and the search space associated with a different set of control information messages are configured in such a way that they can be shared. In another example embodiment, the sharing is enabled when the DCI format sizes associated with the two control information messages are the same. In some embodiments, the configuration of the search space is carried out to allow the sharing of the search space among control information messages corresponding to the same and/or different component carriers. Next, at 1006, control information messages associated with one or more component carriers is obtained. The control information messages may convey information regarding uplink and/or downlink transmissions for particular component carriers. For example, the control information messages may include scheduling information for uplink and/or downlink transmissions, transmit power values and/or power control commands, and the like. In one example, the control information messages comprises one or more DCI messages that are configured to be transmitted on PDCCH.

Referring back to FIG. 10, the process 1000 continues, at 1008, by mapping the control information messages onto the search spaces. In one example, the DCI messages associated with one or more component carriers are mapped to particular CCEs associated with a PDCCH. In an example embodiment, when search space sharing is used, two control information messages of two different component carriers can be mapped to the search space associated with the first component carrier. In another example embodiment, when search space sharing is used, two control information messages of two different component carriers can be mapped to the search space associated with a second component carrier. In another example embodiment, the sharing is only enabled if the DCI format sizes of the two control information messages are the same. In some embodiments, where cross-carrier signaling is used, the sharing of the search space is carried out when the two or more search spaces of different component carriers are located on the same component carrier. In some embodiments, the sharing of the search space is carried out when the two or more search spaces of different component carriers are located on different component carriers. In such a scenario, cross-carrier signaling may or may not be used.

The process 1000 that is illustrated in FIG. 10 continues at 1010, where the control information is transmitted. For example, the control information can be transmitted to one of more user equipment. The control information can be transmitted, at 1010, on, for example, a PDCCH.

Figure 11:
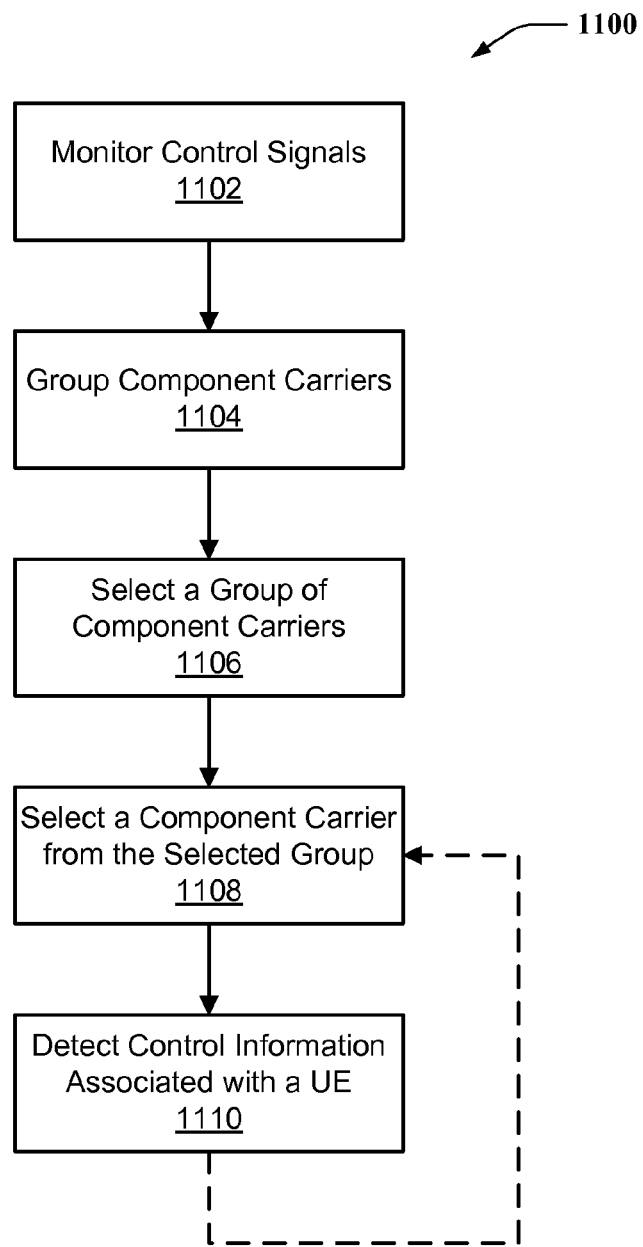
FIG. 11 is a flowchart illustrating the operation of another embodiment.

FIG. 11 illustrates the operations that are carried out in accordance with another example embodiment. The process 1100 that is illustrated in FIG. 11 starts, at 1102, where control signals are monitored. For example a user equipment may receive and monitor signals that are carried on a PDCCH. The process 1100 continues, at 1104, by grouping the component carriers. The component carriers can be part of a multiple component carrier communication system. In one example embodiment, the grouping of the component carriers may be done according to the DCI format sizes associated with the component carriers. For instance, all component carriers having identical DCI format sizes can be grouped together. In some example embodiments, the grouping, at 1104, can be carried out in accordance with the transmission modes.

The process 1100 continues, at 1106, by selecting a group of component carriers. For example, a group of component carriers associated with a first DCI format size is selected. At 1108, the process 1100 continues by selecting a component carrier from the selected group and detecting, at 1110, the control information messages associated with a user equipment that may be carried on the selected component carrier. For example, a user equipment may decode a portion of a PDCCH associated with a component carrier to ascertain if the PDCCH contains the DCI messages associated with the user equipment. In some embodiments, the selected component carrier contains the control information messages associated with the uplink/downlink transmissions on the same component carrier and/or the control information messages associated with the uplink/downlink transmissions on other component carriers. The detection of the control information messages, at 1110, may include conducting a blind detection over two or more search spaces that are associated with DCI formats of the same size.

As indicated by the dashed line in FIG. 11, the process 1100 may further return to selecting another component carrier, at 1108, if the appropriate control information message could not be obtained from the first selected component carrier. In some embodiments, where the control information messages associated with a user equipment reside on more than one component carrier, the process may, regardless of the detection of a first control information, continue selecting additional component carriers until all component carriers within a group are exhausted.

For purposes of simplicity of explanation, the operations in FIG. 10 and FIG. 11 are shown and described as a series of acts. However, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed embodiments.

Figure 12:
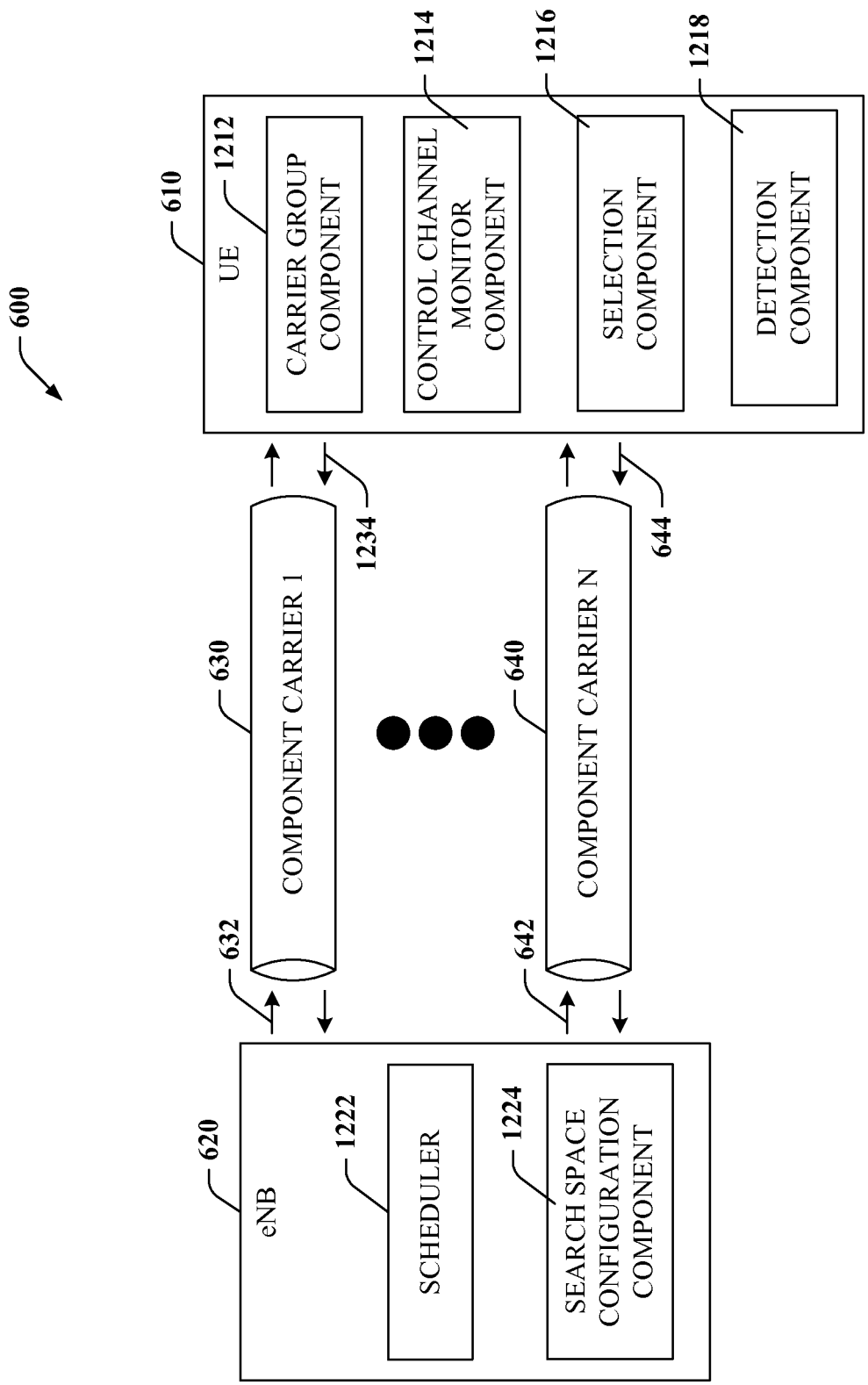
FIG. 12 illustrates a system that can accommodate various embodiments.

FIG. 12 illustrates an exemplary system 600 capable of supporting the various operations described above. As discussed in connection with FIG. 6, the system 600 includes a eNB 620 that can transmit and/or receive information, signals, data, instructions, commands, bits, symbols and the like. FIG. 12 also illustrates a user equipment 610, that is in communication with the eNB 620 using "component carrier 1" 630 through "component carrier N" 640. The user equipment 610 can transmit and/or receive information, signals, data, instructions, commands, bits, symbols and the like. Moreover, although not shown, it is contemplated that the system 600 can include additional base stations and/or user equipment.

In some embodiments, the eNB 620 can include a scheduler 1222 that allocates resources on a link (e.g., downlink or uplink) to the user equipment 610 and/or any other user equipment (not shown) that is served by the eNB 620. The scheduler 1222 can select resource blocks (RBs) on one or more subframes that are intended to carry data associated with the user equipment 610. For example, the scheduler 1222 can assign RBs of downlink subframes for data transmitted to the user equipment 610 and the scheduler 1222 can assign RBs of uplink subframes for data transmitted by the user equipment 610. The allocated RBs can be indicated to the user equipment 610 via control channel signaling (e.g., control information messages) included on a control channel such as PDCCH. The eNB 620 may also include a search space configuration component 1224 that can enable the configuration of search spaces associated with one or more control information messages. The search space configuration component 1224 can operate in association with one or more of the "component carrier 1" 630 through "component carrier N" 640. For example, the search space configuration component 1224 can configure two or more search spaces to be shared among control information messages associated with two or more component carrier transmissions.

In some embodiments, the user equipment 610 that is shown in FIG. 12 can include a carrier group component 1212 that can be configured to group of one or more component carriers. The carrier group component 1212 can, for example, be configured to group the component carriers based on the DCI size of the control information carried on the component carriers. The carrier group component 1212 can also be configured to group the component carriers based on the transmission mode associated of the communication system. The user equipment 610 can also include a control channel monitor component 1214 that allows the user equipment 610 to monitor the control channels of "component carrier 1" 630 through "component carrier N" 640. Moreover, a selection component 1216 within the user equipment 610 can be configured to allow the selection of a group of component carriers, as well as the selection of a particular component carrier within the group of component carriers. The user equipment 610 can also include a detection component 1218 that enables the detection of the control information messages that are carried on the control channels of "component carrier 1" 630 through "component carrier N" 640. For example, the detection component 1218 can be configured to conduct a blind detection of the DCI messages within a search space.

Figure 13:
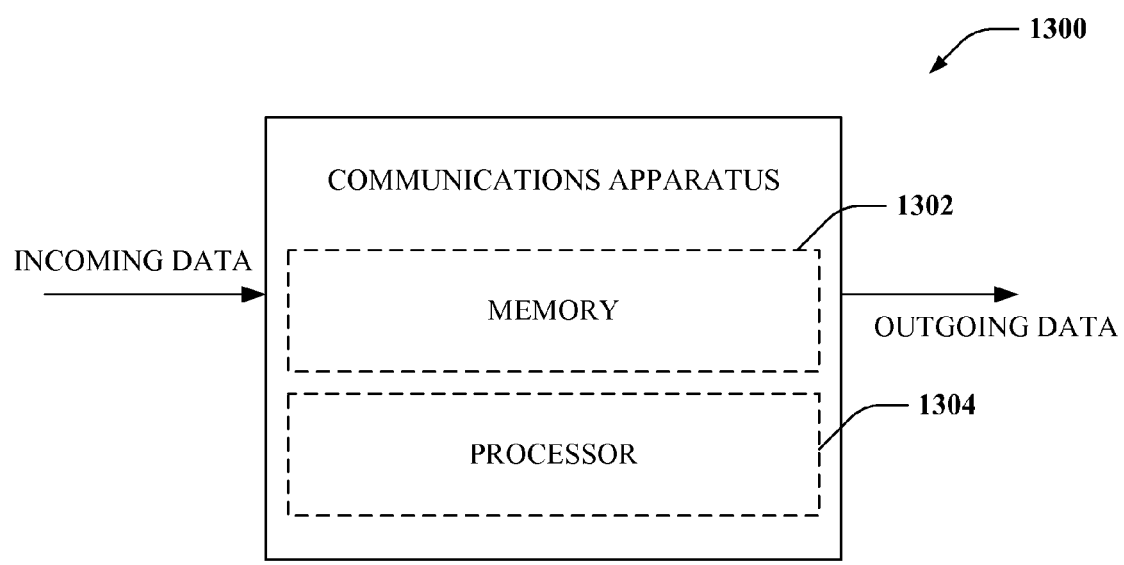
FIG. 13 illustrates an apparatus within which various embodiments may be implemented.

FIG. 13 illustrates an apparatus 1300 within which the various disclosed embodiments may be implemented. In particular, the apparatus 1300 that is shown in FIG. 13 may comprise at least a portion of a base station or at least a portion of a user equipment (such as the eNB 620 and the user equipment 610 that are depicted in FIG. 6 and FIG. 12) and/or at least a portion of a transmitter system or a receiver system (such as the transmitter system 210 and the receiver system 250 that are depicted in FIG. 2). The apparatus 1300 that is depicted in FIG. 13 can be resident within a wireless network and receive incoming data via, for example, one or more receivers and/or the appropriate reception and decoding circuitry (e.g., antennas, transceivers, demodulators and the like). The apparatus 1300 that is depicted in FIG. 13 can also transmit outgoing data via, for example, one or more transmitters and/or the appropriate encoding and transmission circuitry (e.g., antennas, transceivers, modulators and the like). Additionally, or alternatively, the apparatus 1300 that is depicted in FIG. 13 may be resident within a wired network.

FIG. 13 further illustrates that the apparatus 1300 can include a memory 1302 that can retain instructions for performing one or more operations, such as signal conditioning, analysis and the like. Additionally, the apparatus 1300 of FIG. 13 may include a processor 1304 that can execute instructions that are stored in the memory 1302 and/or instructions that are received from another device. The instructions can relate to, for example, configuring or operating the apparatus 1300 or a related communications apparatus. It should be noted that while the memory 1302 that is depicted in FIG. 13 is shown as a single block, it may comprise two or more separate memories that constitute separate physical and/or logical units. In addition, the memory while being communicatively connected to the processor 1304, may reside fully or partially outside of the apparatus 1300 that is depicted in FIG. 13. It is also to be understood that one or more components, such as the scheduler 1222, the search space configuration component 1224, the carrier group component 1212, the control channel monitor component 1214, the selection component 1216 and/or the detection component 1218 that are shown in FIG. 12, can exist within a memory such as memory 1302.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1300 of FIG. 13 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented on non-transitory computer readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques. The disclosed embodiments can also be used in conjunction with systems that use multiple component carriers. For example, the disclosed embodiments can be used in conjunction with LTE-A systems.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 610 FIG. 12). In the alternative, the processor and the storage medium may reside as discrete components in a user equipment (e.g., 610 FIG. 12). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
   configuring a plurality of component carriers in a wireless communication system;
   allocating a first search space for control information messages associated with a first component carrier and a second search space for control information messages associated with a second component carrier, wherein the first and second search spaces are shared by control information messages associated with the first and second component carriers based on the first and second component carriers comprising the same downlink control information (DCI) format size;
   obtaining at least a first control information message associated with the first component carrier; and
   transmitting the first control information message using at least the second search space.

2. The method of claim 1, further comprising transmitting the first control information message using the first search space.

3. The method of claim 1, wherein the first and the second search spaces accommodate control information messages having a same size.

4. The method of claim 3, wherein the first search space and the second search space are located on one component carrier.

5. The method of claim 1, wherein the first and the second component carriers are associated with a same transmission mode.

6. The method of claim 1, wherein the first search space and the second search space are located on the first component carrier.

7. The method of claim 1, wherein the first search space and the second search space are located on different component carriers.

8. The method of claim 7, wherein the first search space is located on the first component carrier and the second search space is located on the second component carrier.

9. The method of claim 1, wherein the first control information message comprises a carrier indicator field (CIF).

10. The method of claim 9, wherein the CIF is three bits.

11. The method of claim 1, wherein the first search space and the second search space each comprise a common search space and a user-specific search space.

12. The method of claim 11, wherein the transmission of the first control information is carried out using the user-specific search space associated with the second search space.

13. The method of claim 1, wherein each of the first search space and the second search space consists of a user-specific search space only.

14. The method of claim 1, wherein the first control information message is a downlink control information (DCI) message in a long term evolution (LTE) system.

15. The method of claim 1, wherein the first search space and the second search space comprise overlapping control channel elements in a downlink control channel.

16. The method of claim 1, wherein the first search space and the second search space comprise non-overlapping control channel elements in a downlink control channel.

17. A method, comprising:
   receiving information in a wireless communication system that operates using a plurality of component carriers, the received information comprising one or more control information messages associated with one or more of the component carriers; and
   searching a first and a second search space to detect a first control information message relating to a first component carrier, wherein
      the first search space and the second search space are shared by control information messages associated with the first and second component carriers based on the control information messages associated with the first and second component carriers comprising the same downlink control information (DCI) format size.

18. The method of claim 17, wherein searching the first and the second search spaces comprises conducting a blind detection to detect an association between the first control information message and a user equipment.

19. The method of claim 17, wherein the first control information message is carried within the first and/or the second search space.

20. The method of claim 17, wherein the first and the second search spaces accommodate control information messages having a same size.

21. The method of claim 17, wherein the first and the second component carriers are associated with a same transmission mode.

22. The method of claim 17, wherein the first search space and the second search space are located on one component carrier.

23. The method of claim 17, wherein the first search space and the second search space are located on the first component carrier.

24. The method of claim 17, wherein the first search space and the second search space are located on different component carriers.

25. The method of claim 24, wherein the first search space is located on the first component carrier and the second search space is located on the second component carrier.

26. The method of claim 17, wherein the first control information message comprises a carrier indicator field (CIF).

27. The method of claim 17, wherein the first search space and the second search space each comprise a common search space and a user-specific search space.

28. The method of claim 27, wherein the transmission of the first control information is carried out using the user specific search space associated with one of the second search space.

29. The method of claim 17, wherein each of the first search space and the second search space consists of a user-specific search space only.

30. The method of claim 17, wherein the first control information message is a downlink control information (DCI) message in a long term evolution (LTE) system.

31. The method of claim 17, wherein the first search space and the second search space comprise overlapping control channel elements in a downlink control channel.

32. The method of claim 17, wherein the first search space and the second search space comprise non-overlapping control channel elements in a downlink control channel.

33. An apparatus, comprising:
means for configuring a plurality of component carriers in a wireless communication system;
means for allocating a first search space for control information messages associated with a first component carrier and a second search space for control information messages associated with a second component carrier, wherein the first and second search spaces are shared by control information messages associated with the first and second component carriers based on the first and second component carriers comprising the same downlink control information (DCI) format size;
means for obtaining at least a first control information message associated with the first component carrier; and
means for transmitting the first control information message using at least the second search space.

34. An apparatus, comprising:
means for receiving information in a wireless communication system that operates using a plurality of component carriers, the received information comprising one or more control information messages associated with one or more of the component carriers; and
means for searching a first and a second search space to detect a first control information message relating to a first component carrier, wherein the first search space and the second search space are shared by control information messages associated with the first and second component carriers based on the control information messages for the first and second component carriers comprising the same downlink control information (DCI) format size.

35. An apparatus, comprising:
a processor; and
a memory comprising processor executable code, the processor executable code, when executed by the processor, configures the apparatus to:
configure a plurality of component carriers in a wireless communication system;
allocate a first search space for control information messages associated with a first component carrier and a second search space for control information messages associated with a second component carrier, wherein the first and second search spaces are shared by control information messages associated with the first and second component carriers based on the first and second component carriers comprising the same downlink control information (DCI) format size;
obtain at least a first control information message associated with the first component carrier; and
transmit the first control information message using at least the second search space.

36. The apparatus of claim 35, wherein the processor executable code, when executed by the processor, further configures the apparatus to transmit the first control information message using the first search space.

37. The apparatus of claim 35, wherein the first and the second search spaces accommodate control information messages having a same size.

38. The apparatus of claim 37, wherein the first search space and the second search space are located on one component carrier.

39. The apparatus of claim 35, wherein the first and the second component carriers are associated with a same transmission mode.

40. The apparatus of claim 35, wherein the first search space and the second search space are located on the first component carrier.

41. The apparatus of claim 35, wherein the first search space and the second search space are located on different component carriers.

42. The apparatus of claim 41, wherein the first search space is located on the first component carrier and the second search space is located on the second component carrier.

43. The apparatus of claim 35, wherein the first control information message comprises a carrier indicator field (CIF).

44. The apparatus of claim 35, wherein the first search space and the second search space each comprise a common search space and a user-specific search space.

45. The apparatus of claim 44, wherein the processor executable code, when executed by the processor, further configures the apparatus to transmit the first control information using the user specific search space associated with the second search spaces.

46. The apparatus of claim 35, wherein each of the first search space and the second search space consists of a user-specific search space only.

47. The apparatus of claim 35, wherein the first control information message is a downlink control information (DCI) message in a long term evolution (LTE) system.

48. The apparatus of claim 35, wherein the first search space and the second search space comprise overlapping control channel elements in a downlink control channel.

49. The apparatus of claim 35, wherein the first search space and the second search space comprise non-overlapping control channel elements in a downlink control channel.

50. An apparatus, comprising:
a processor; and
a memory comprising processor executable code, the processor executable code, when executed by the processor, configures the apparatus to:
receive information in a wireless communication system that operates using a plurality of component carriers, the received information comprising one or more control information messages associated with one or more of the component carriers; and
search a first and a second search space to detect a first control information message relating to a first component carrier, wherein
the first search space and the second search space are shared by control information messages associated with the first and second component carriers based on the control information messages associated with the first and second component carriers comprising the same downlink control information (DCI) format size.

51. The apparatus of claim 50, wherein the processor executable code, when executed by the processor, configures the apparatus to search the first and the second search spaces by conducting a blind detection to detect an association between the first control information message and a user equipment.

52. The apparatus of claim 50, wherein the first control information message is carried within the first and/or the second search space.

53. The apparatus of claim 50, wherein the first and the second search spaces accommodate control information messages with a same size.

54. The apparatus of claim 50, wherein the first and the second component carriers are associated with a same transmission mode.

55. The apparatus of claim 50, wherein the first search space and the second search space are located on one component carrier.

56. The apparatus of claim 50, wherein the first search space and the second search space are located on the first component carrier.

57. The apparatus of claim 50, wherein the first search space and the second search space are located on different component carriers.

58. The apparatus of claim 57, wherein the first search space is located on the first component carrier and the second search space is located on the second component carrier.

59. The apparatus of claim 50, wherein the first control information message comprises a carrier indicator field (CIF).

60. The apparatus of claim 50, wherein the first search space and the second search space each comprise a common search space and a user-specific search space.

61. The apparatus of claim 60, wherein the processor executable code, when executed by the processor, configures the apparatus to transmit the first control information using the user specific search space associated with one of the second search space.

62. The apparatus of claim 50, wherein each of the first search space and the second search space consists of a user-specific search space only.

63. The apparatus of claim 50, wherein the first control information message is a downlink control information (DCI) message in a long term evolution (LTE) system.

64. The apparatus of claim 50, wherein the first search space and the second search space comprise overlapping control channel elements in a downlink control channel.

65. The apparatus of claim 50, wherein the first search space and the second search space comprise non-overlapping control channel elements in a downlink control channel.

66. A computer program product, embodied on a non-transitory computer readable medium, comprising:
computer code for configuring a plurality of component carriers in a wireless communication system;
computer code for allocating a first search space for control information messages associated with a first component carrier and a second search space for control information messages associated with a second component carrier, wherein the first and second search spaces are shared by control information messages associated with the first and second component carriers based on the first and second component carriers comprising the same downlink control information (DCI) format size;
computer code for obtaining at least a first control information message associated with the first component carrier; and
computer code for transmitting the first control information message using at least the second search space.

67. A computer program product, embodied on a non-transitory computer readable medium, comprising:
computer code for receiving information in a wireless communication system that operates using a plurality of component carriers, the received information comprising one or more control information messages associated with one or more of the component carriers; and
computer code for searching a first and a second search space to detect a first control information message relating to a first component carrier, wherein
the first search space and the second search space are shared by control information messages associated with the first and second component carriers based on the control information messages associated with the first and second component carriers comprising the same downlink control information (DCI) format size.

* * * * *